(12) United States Patent
Müller et al.

(10) Patent No.: US 7,729,385 B2
(45) Date of Patent: Jun. 1, 2010

(54) TECHNIQUES FOR UTILIZATION OF SPARE BANDWIDTH

(75) Inventors: Dominique Müller, Helsinki (FI); Larri Vermola, Turku (FI); Harri Pekonen, Raisio (FI)

(73) Assignee: Nokia Corporation, Espoo (FI)

( * ) Notice: Subject to any disclaimer, the term of this patent is extended or adjusted under 35 U.S.C. 154(b) by 1009 days.

(21) Appl. No.: 10/976,851

(22) Filed: Nov. 1, 2004

(65) Prior Publication Data

US 2006/0092867 A1    May 4, 2006

(51) Int. Cl.
- H04N 7/173 (2006.01)
- H04L 12/28 (2006.01)
- H04J 3/16 (2006.01)
- H04H 20/28 (2008.01)

(52) U.S. Cl. .................. 370/486; 370/468; 370/412; 725/95

(58) Field of Classification Search .......... 370/390, 370/485, 486, 487, 412, 468, 395.21, 401; 725/62, 86, 91, 92, 94, 95, 98, 115, 116, 725/118

See application file for complete search history.

(56) References Cited

U.S. PATENT DOCUMENTS

| | | | |
|---|---|---|---|
| 6,909,726 B1 * | 6/2005 | Sheeran | 370/468 |
| 7,280,475 B2 * | 10/2007 | Tanaka et al. | 370/235 |
| 7,313,142 B2 * | 12/2007 | Matsuo et al. | 370/395.32 |
| 7,546,383 B2 * | 6/2009 | Smith | 709/246 |
| 2002/0023270 A1 | 2/2002 | Thomas et al. | |
| 2002/0138500 A1 * | 9/2002 | Bechtel et al. | 707/104.1 |
| 2003/0001901 A1 * | 1/2003 | Crinon et al. | 345/810 |
| 2003/0005455 A1 * | 1/2003 | Bowers | 725/90 |
| 2003/0187977 A1 * | 10/2003 | Cranor et al. | 709/224 |
| 2003/0191857 A1 * | 10/2003 | Terrell et al. | 709/244 |
| 2004/0123332 A1 * | 6/2004 | Hanson | 725/132 |

FOREIGN PATENT DOCUMENTS

| | | |
|---|---|---|
| CN | 1132011 A | 9/1996 |
| EP | 1 152 552 A2 | 11/2001 |
| EP | 1 217 565 A2 | 6/2002 |
| WO | WO 0219161 A2 | 3/2002 |
| WO | WO 03/045053 | 5/2003 |

OTHER PUBLICATIONS

"Transmission System for Handheld Terminals (DVB H)"; Digital Video Broadcasting; DVB Document A081; Jun. 2004; pp. 1-11.

* cited by examiner

Primary Examiner—Hanh Nguyen
(74) Attorney, Agent, or Firm—Locke Lord Bissell & Liddell

(57) ABSTRACT

A packet encapsulator includes a filter module that identifies one or more carousel packets from a plurality of received packets. These one or more carousel packets are then stored in a packet buffer. The packet encapsulator also includes a channel queue for enqueuing packets for transmission across a broadcast transmission medium. For instance, the channel queue also receives the forwarding packets from the filter module. The channel queue also receives the one or more carousel packets from the packet buffer when at least a predetermined amount of available bandwidth exists in the broadcast transmission medium. The broadcast transmission medium may be a digital broadcast network such as a DVB handheld (DVB-H) network or a DVB terrestrial (DVB-T) network. Alternatively, the broadcast transmission medium may be a cable network.

24 Claims, 7 Drawing Sheets

TECHNIQUES FOR UTILIZATION OF SPARE BANDWIDTH

FIELD OF THE INVENTION

The present invention relates to communications. More particularly, the present invention relates to the effective utilization of allocated bandwidth.

BACKGROUND OF THE INVENTION

Delivering multimedia content, such as audio and/or video, to terminal devices in digital format is becoming increasingly commonplace. Such content may include audio, video, and other content delivered over broadcast transmission media. Due to their nature, the bitrate of a multimedia (audio/video) stream may vary over time. Typical bit rates are 128-384 kilobits per second (kbps). Recent advances in video and audio compression accentuate this effect because relative bit rate variations are now greater than with older compression technologies.

A broadcast channel, such as a digital video broadcast handheld (DVB-H) has a fixed total capacity. The channel's exact capacity depends on the employed modulation parameters. For DVB-H, capacity is typically between 5 and 15 megabits per second (Mbps) for mobile and indoor reception. In DVB-H, this total bandwidth is divided into a number of timeslice channels that each have a static bit rate to facilitate mobility and handover.

For each multimedia stream, a certain amount of bandwidth is typically allocated to the corresponding broadcast channel (e.g., to the corresponding DVB-H timeslice). Ideally (but not necessary), a DVB-H timeslice channel contains only a single multimedia stream to lower power consumption in terminal devices.

Such bandwidth constraints can be enforced for a broadcast channel. This enforcement may involve buffering to flatten out bit rate variations. However, excessive buffering may introduce delays. Thus, an approach to ensure that delays do not become excessive involves allocating more broadcast channel bandwidth than the long term average of the stream bit rate. For DVB-H timeslice channels, this means that there will typically be leftover or spare bandwidth.

Bandwidth is a precious resource. Therefore, it is desirable to reduce the amount of wasted bandwidth.

SUMMARY OF THE INVENTION

The present invention provides a packet encapsulator. The packet encapsulator includes a filter module that identifies one or more carousel packets from a plurality of received packets. These one or more carousel packets are then stored in a packet buffer. The packet encapsulator also includes a channel queue for enqueuing packets for transmission across a broadcast transmission medium. For instance, the channel queue also receives the forwarding packets from the filter module. In addition, the channel queue receives the one or more carousel packets from the packet buffer when at least a predetermined amount of available bandwidth exists in the broadcast transmission medium.

The broadcast transmission medium may be a digital broadcast network such as a digital video broadcast (DVB) handheld (DVB-H) network or a DVB terrestrial (DVB-T) network. Alternatively, the broadcast network may be another type of digital broadcast network, including ATSC, ISDB-T, Digital Audio Broadcasting (DAB), or Digital Radio Mondiale (DRM). As a further alternative, the broadcast transmission medium may be a cable network.

The packet encapsulator may further include a comparison table for storing index values that correspond to particular carousel packets in the packet buffer. These index values may be hash values computed from the corresponding carousel packet value.

Also, the packet encapsulator may include a receiving queue having one or more entries that correspond to particular carousel packets stored in the packet buffer. These entries in the receiving queue are arranged in a chronological order according to reception timestamp values of the one or more carousel packets in the packet buffer.

Moreover, the packet encapsulator may include a sending queue having entries that correspond to particular carousel packets stored in the packet buffer. The sending queue may also include a last received pointer designating where entries corresponding to new packets are to be added, and a last sent pointer designating an entry that corresponds to the carousel packet in the packet buffer that was most recently sent to the channel queue.

The received packets may be Internet protocol (IP) packets. These packets may include a static timestamp field.

The present invention also provides a method and a computer program product that establishes a carousel session with a remote server and receives a carousel packet from the remote server. The method and computer program product add the received carousel packet to a packet buffer when the packet has not been previously received, and otherwise update a timestamp of the received carousel packet in the packet buffer when the carousel packet has been previously received and stored in the packet buffer. Also, the method and computer program product update one or more access data structures based on the received carousel packet, and receive an indication of available bandwidth in a broadcast transmission medium. In response to this indication, the method and computer program product send one or more carousel packets stored in the packet buffer to a channel queue.

The broadcast transmission medium may be a digital broadcast network such as a DVB handheld (DVB-H) network or a DVB terrestrial (DVB-T) network. Alternatively, the broadcast transmission medium may be a cable network.

The present invention advantageously provides for efficient use of bandwidth. For instance, spare bandwidth may be made available for other types of data services that do not require a guaranteed bandwidth. Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
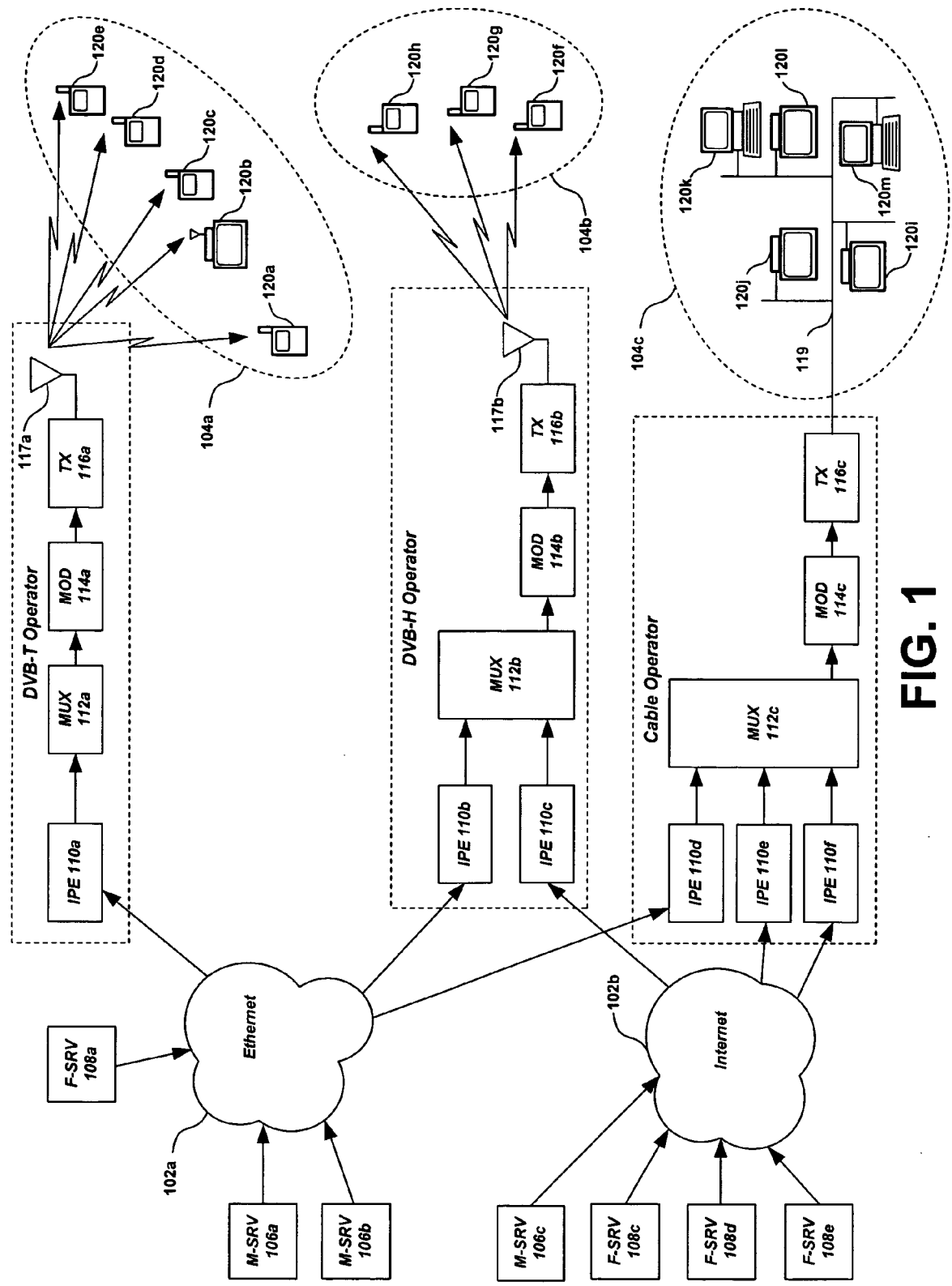
FIG. 1 is a diagram of an operational environment according to embodiments of the present invention.

FIG. 1 is a diagram of a broadcast environment in which the present invention may be employed. This environment involves multiple packet-based networks 102 and multiple broadcast networks 104.

Packet-based networks 102 perform communications through the exchange of packets, such as Internet Protocol (IP) packets, through various protocols. Accordingly, networks 102 may be of various types. For instance, the environment shown in FIG. 1 includes a packet-based network 102a that is a local area network (such as an Ethernet), and a packet-based network 102b that is the Internet.

Broadcast networks 104 provide point-to-multipoint type communications over a broadcast transmission medium. Each broadcast network may employ various wired or wireless technologies. For instance, FIG. 1 shows a broadcast network 104a that is a DVB-T network, and a broadcast network 104b that is a DVB-H network. In addition, FIG. 1 shows a broadcast network 104c that is a cable network, such as a Data Over Cable Service Interface Specification (DOCSIS) network. Networks 104a and 104b transmit wireless signals that may be received by devices within coverage areas.

The environment of FIG. 1 includes a plurality of multimedia streaming servers (M-SRVs) 106 that are coupled to one or more of packet-based networks 102. Servers 106 produce multimedia streams containing content such as audio, video, and/or text. For example, a particular server 106 may provide multiple audio streams via multiple audio channels. In addition, this server may provide text streams that are synchronized with corresponding audio streams.

In addition to M-SRVs 106, the environment of FIG. 1 includes a plurality of file streaming servers (F-SRVs) 108. These servers produce file streams in the form of file carousels. A file carousel typically contains several files that are transmitted using, for example, IP multicast. These files are transmitted one at a time at controlled bit rates until all files have been transmitted. At this point the file carousel repeats the transmission of the files. This pattern may go on either continuously or for fixed intervals of time.

Each of servers 106 and 108 may distribute their streams to one or more destinations across packet-based networks 102. Such distribution may involve IP multicasting protocols. The combined bit rate of all streams produced by a particular server typically varies over time. In embodiments, these variations are around a stable average.

FIG. 1 shows multiple IP encapsulators (IPEs) 110 that are each coupled to one or more of packet-based networks 102. IPEs 110 receive packet streams produced by servers 106 and 108 and operate as gateways between packet-based networks 102 and broadcast networks 104. In particular, IPEs 110 convert received packet streams into broadcast network transport streams (e.g., DVB-H transport streams, and DVB-T transport streams).

For each broadcast network 104, FIG. 1 shows a multiplexer (MUX) 112, a modulator (MOD) 114, and a transmitter (TX) 116. In particular, FIG. 1 shows a MUX 112a, a MOD 114a, and a TX 116a corresponding to broadcast network 104a, a MUX 112b, a MOD 114b, and a TX 116b corresponding to broadcast network 104b, and a MUX 112c, a MOD 114c, and a TX 116c corresponding to broadcast network 104c. As shown in FIG. 1, each MUX 112 may be coupled to one or more IPEs 110. Also, each MOD 114 is coupled between its corresponding MUX 112 and TX 116.

Each multiplexer 112 combines transport streams from one or more different sources (such as different IPEs 110) into a single transmission stream. This single stream is sent to the coupled modulator 114, which converts the transmission stream from a digital representation into a radio frequency (RF) signal. The coupled transmitter (TX) 116 amplifies the RF signal and transmits it (or broadcasts) the signal to the devices in the corresponding broadcast network 104. For broadcast networks 104a and 104b, antennas 117a and 117b allow such transmissions to propagate wirelessly. However, for broadcast network 104c, such transmissions propagate through a cable medium 119.

FIG. 1 shows that broadcast networks 104 include one or more receivers (RXs) 120, which are also referred to herein as terminal devices. These devices receive and process RF signals transmitted by TXs 116. This allows the devices to present the services (e.g., streams) conveyed by the RF signals to its end-users. As shown in FIG. 1, devices 120 may include portable handheld devices (such as wireless telephones and PDAs), as well as televisions, set-top boxes, and personal computers.

In addition, broadcast networks 104 may include other devices, such as repeaters and monitors (not shown). A repeater (REP) receives an RF signal from a TX 116, amplifies it, and transmits it again, either on the same frequency or a different frequency. A monitor (MON) is a special receiver having the sole purpose of monitoring RF signals received from a transmitter 116 and providing alarms to the operator of the corresponding broadcast network 104.

II. Timeslicing

Figure 2:
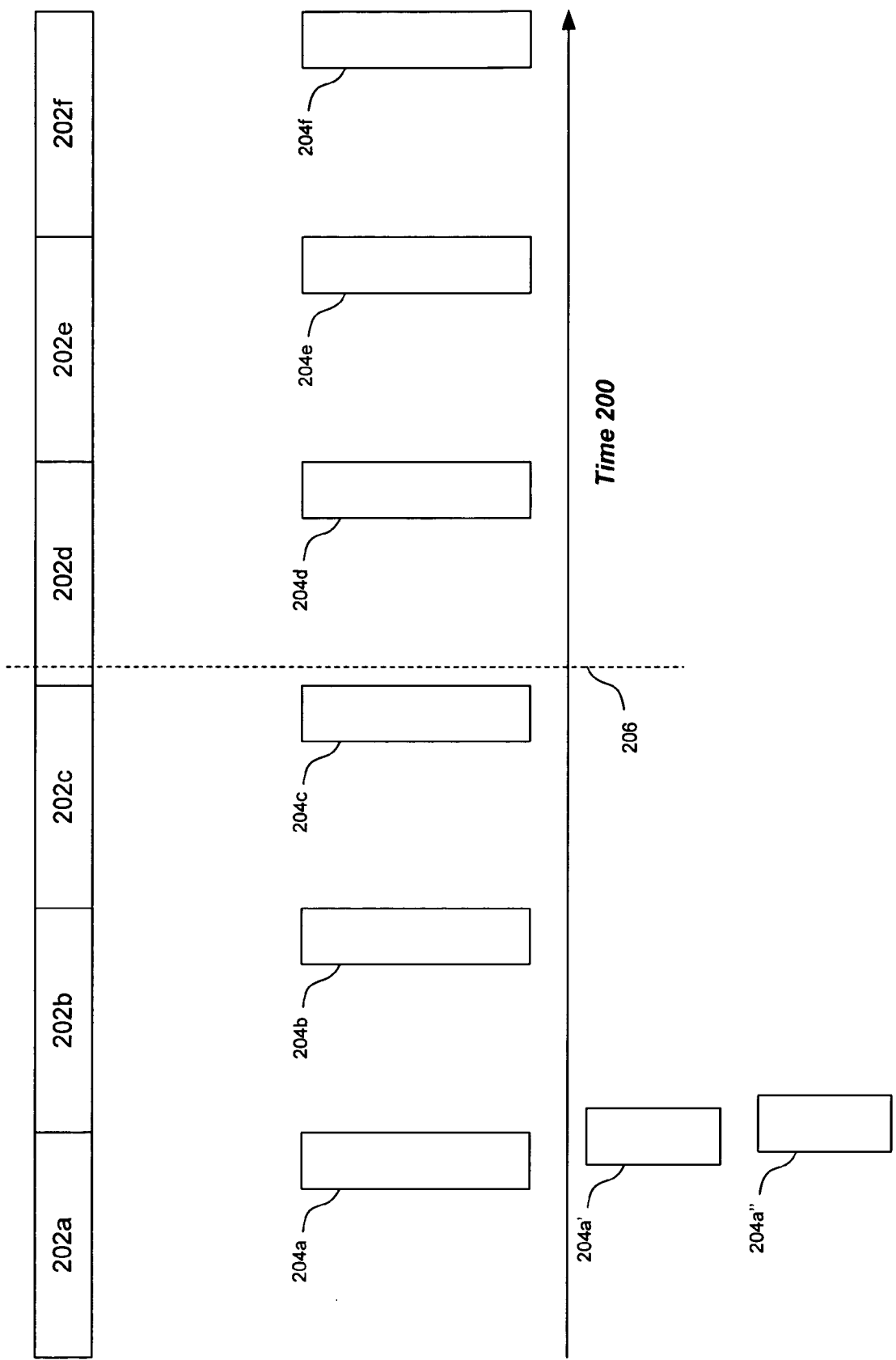
FIG. 2 is a diagram showing an exemplary timing of transmissions.

FIG. 2 is a diagram illustrating broadcast network transmissions according to an embodiment of the present invention. These transmissions may be generated, for example, by a DVB transmitter and be received by one or more terminal devices.

As shown in FIG. 2, a plurality of time slots 202 exist in succession. A service, such as a streaming video program (e.g., an ice hockey game) is transmitted during these time slots. In particular, FIG. 2 shows the service starting stream at a time slot 202a and ending at a time slot 202f.

The service stream is transmitted according to a timeslicing technique. That is, the service stream is fragmented into burst transmissions (or packets) 204, which occur in particular portions of time slots 202. These particular portions are referred to as time slices. In particular, FIG. 2 shows bursts 204a-204f occurring within particular time slices of slots 202a-202f, respectively.

In embodiments, each burst 204 has a fixed duration. Also, consecutive bursts 204 are separated in time by a fixed interval. However, in further embodiments, the duration of a burst and/or the intervals between bursts may vary. Information regarding such variations may be signaled within these bursts so that the bursts can be received by the terminal devices.

Various burst timings may exist. For example, FIG. 2 includes bursts 204a' and 204a'' that are alternative timings for burst 204a. Bursts may start during a particular time slot but end in a subsequent time slot, as illustrated by alternative bursts 204a' and 204a''. Such occurrences may be caused by delays from processing, such as buffering and encapsulation. In embodiments, a burst 204 may end no earlier than the end of its corresponding time slot.

As described above, bursts 204 are received by one or more terminal devices. Upon receipt, each device buffers and processes (e.g., decodes, error corrects, etc.) the data carried in these bursts. As a result, content such as video and/or audio is rendered for consumption by device users.

Devices may be portable. Accordingly, during the delivery of a service (such as a television program), a device may move into a location where bursts cannot be received. When this occurs, the device may receive a notification indicating that it is in such an area. Interruptions may occur for other reasons as well. FIG. 2 shows an example interruption 206 occurring during timeslot 202d. As a result of this interruption, the device is unable to receive bursts 204d, 204e, and 204f.

In embodiments, bursts 204 may include timestamps that indicate their time of transmission. By analyzing the timestamps of received bursts, a terminal device may determine and store which bursts it has received and which bursts it has missed. Based on such determinations, the terminal device may receive the missing bursts through, for example, retransmission and/or data carousel services.

III. Retransmission

Timestamps may be stored with the corresponding bursts or packets at an originating server (e.g., an F-SRV or an M-SRV). This feature advantageously allows missing packets to be retransmitted (or "replayed"). The replaying of data may be in response to a request received from a terminal device. Such a request may be user-originated or automatic.

For instance, when a device enters an area where service transmissions may be received, the device may transmit a request to the server for retransmission (or replaying) of the bursts that it did not receive. This request may specify various retransmission conditions. For instance, the request may specify a time (e.g., set by the device's user) when reception of the missing bursts is desired. Examples of such time specifications include immediate retransmission or retransmission at a predetermined time in the future.

IV. Data Carousel

Users of different devices may each want to receive specific transmissions of a service stream. However, these users may each have different needs. For instance, each user may desire different missing portions of the service stream. To accommodate such differences, the service stream may be delivered as a "data carousel," which transmits the service continuously (e.g., repeatedly). This continuous transmission provides an advantage in that devices may readily access missing portions of a transmitted service.

The data carousel may be one of the services provided by a network operator. Therefore, the existence and contents of a data carousel may be announced in an electronic services guide (ESG). Accordingly, the network operator may choose which services are provided by a data carousel. Access to the data in the carousel may depend on the user subscription to the data carousel service. More particularly, only subscribers of the service may access the data in the carousel.

Data carousels may receive service stream bursts in various ways. For example, a data carousel may be filled with bursts at the same rate as the bursts that are being transmitted in the service stream. Thus, the content of the data carousel continually increases. Alternatively, a data carousel may be formed as soon as a service stream (such as the initial broadcast of an ice hockey game) has ended. At this point, the data carousel may become completely filled to include the entire service stream. Once this occurs, the data carousel may be announced and transmitted. According to a further technique, which falls between the two techniques described above, bursts are placed into the data carousel after the occurrence of a delay.

Like the transmissions of an original service stream, the transmissions from a data carousel may be in bursts. These bursts may have the same duration and time interval separation as the originally transmitted bursts. Alternatively, these bursts may have different durations and/or time interval separations than the original bursts.

Devices may receive notifications regarding the availability of a data carousel service. Such notifications may be in advance of the data carousel's availability, or even in advance of the initial service stream's availability. Accompanying these notifications may be information regarding the accessibility of the data carousel service (e.g., a starting time of the carousel, an address of the carousel service, the carousel service's bandwidth, the duration of the carousel service's availability, etc.). Such information may be provided by the network operator in an ESG.

As described above, devices may determine missing portion(s) of a received service stream through the analysis of timestamps. Accordingly, based on the data carousel service's accessibility, a device may determine appropriate "turn-on" time(s) in order to start receiving its missing service stream portions. In this case, a request does not have to be transmitted to the server (or network operator).

Storage of the service stream (e.g., video program) by the data carousel may be implemented in various ways. For instance, the service stream may be fragmented into data files that represent packets or bursts. In embodiments, these files are linked to each other. Also, each data file may have identifying information, such as a time stamp so that time information may be related to (or mapped to) specific packets. In this case, devices may utilize data carousels to receive portions of a service transmission that were previously received (and consumed).

Thus, terminal devices may utilize data carousels to receive portions of a service transmission that occurred during an interruption of reception. For instance, a terminal device may "count" the duration that a transmission stream is received (and consumed) without interruption. However, when an interruption occurs, the terminal device stores the current count value. This count value may be used (e.g., at a subsequent time) by the terminal device to identify and retrieve the remainder of the service stream from a carousel service.

As an example, a video stream of an ice hockey game is stored in a data carousel as multiple files. Each of these files corresponds to a predetermined time interval (such as five minutes) of the video stream's total duration. When a terminal device requests the downloading of the remainder of the game from 43 minutes onward, the terminal device may commence receiving transmissions with the earliest file covering this requested time (e.g., the file beginning at 40 minutes).

Retransmissions and/or data carousel services may be sent across the same communications media as the original transmissions. However, retransmissions and/or data carousel services may be transmitted using other bearers or media. For instance, using mobile telephony network data transfer capabilities may be used. Examples of such capabilities include general packet radio service (GPRS), Enhanced Data for GSM Evolution (EDGE), Universal Mobile Telecommunications System (UMTS), and others. Accordingly, the nature of such transmissions may be unicast instead of broadcast. The employment of different communications media may be in response to terminal device requests.

V. Packet Carousel

As described above with reference to FIG. 1, IPEs 110 operate as gateways between packet and broadcast networks. In embodiments of the present invention, one or more IPEs 110 may provide a feature referred to herein as a "packet carousel". The packet carousel may work transparently together with any type of file carousel or message delivery system that is implemented at the application layer, for example, M-SRVs 106 and F-SRVs 108.

Figure 3:
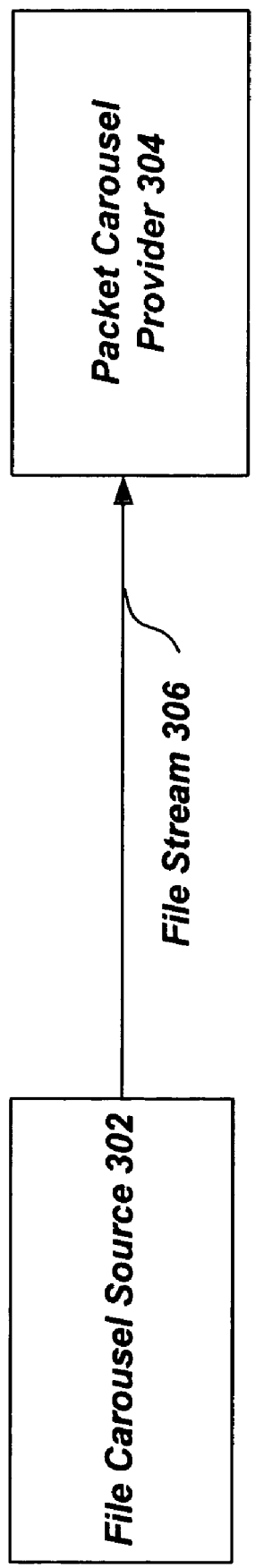
FIG. 3 is a diagram of an exemplary carousel arrangement.

FIG. 3 is a diagram of an exemplary file carousel arrangement. This arrangement includes a file carousel source 302 and a packet carousel provider 304. File carousel source 302 may be, for example, an M-SRV 106 or an F-SRV 108, and packet carousel provider 304 may be implemented in an IPE 110.

In this arrangement, file carousel source 302 outputs a file stream 306 at a constant (e.g., low) bit rate. Stream 306 may include files that form a dynamic file carousel. This carousel may last a predetermined amount of time, such as an entire day. During this day, files can be added to or removed from the carousel, but not changed.

Packet carousel provider 304 implements a "carousel session". A carousel session has a defined lifetime during which packet carousel provider 304 collects received IP packets having addresses (e.g., IP addresses) belonging to a defined set of addresses and broadcasts them whenever there is bandwidth available for carousel transmissions. These collected packets and related information may be stored in one or more queues. These queues are referred to herein as "carousel packet buffers."

Figure 4:
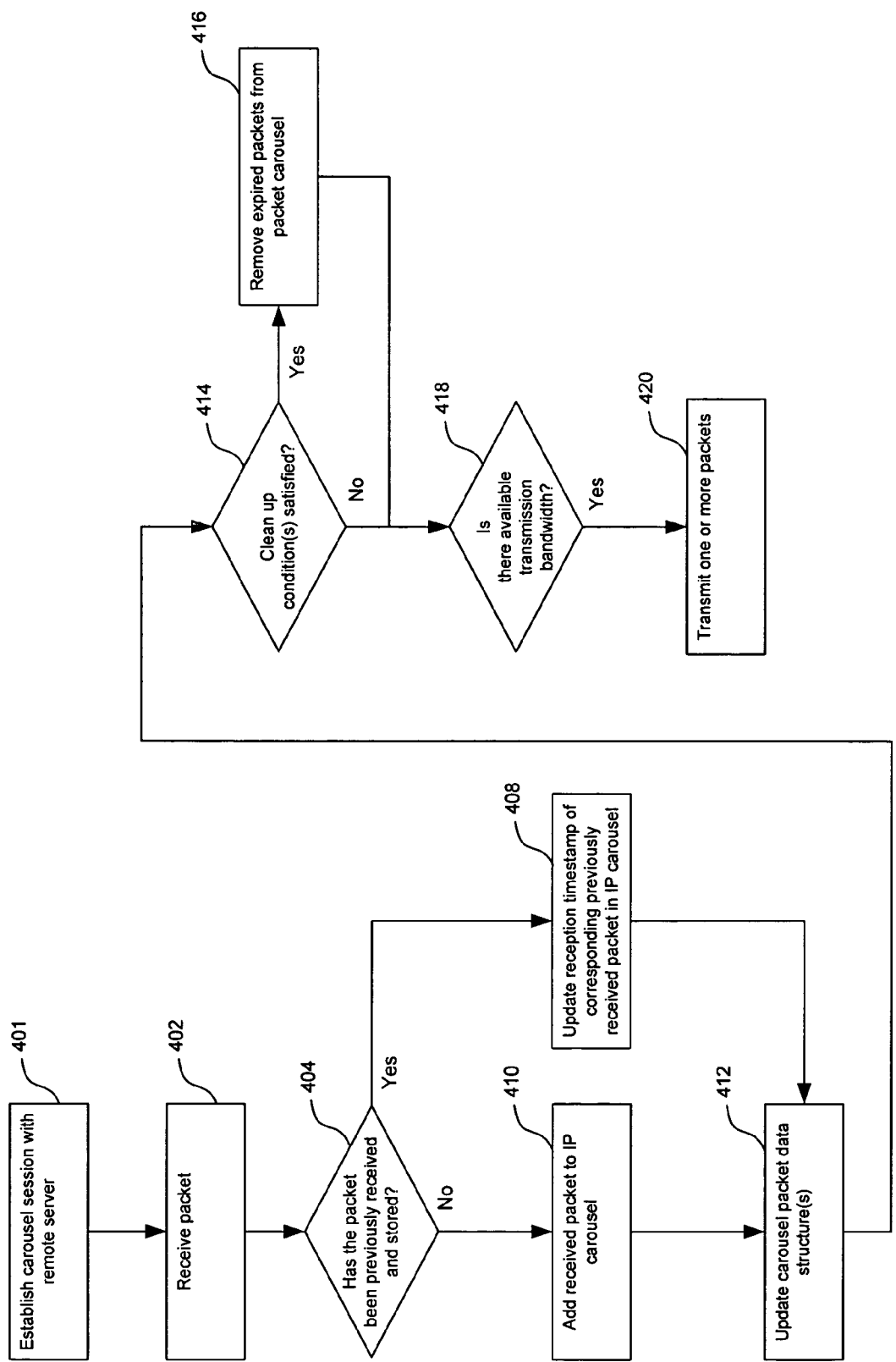
FIG. 4 is a flowchart of a carousel operation, according to an aspect of the present invention.

FIG. 4 is a flowchart of an exemplary operation, according to an embodiment of the present invention. This operation may be performed by a device, such as an IPE 110. As shown in FIG. 4, this operation includes a step 401 in which the device sets up a carousel session with a remote server, such as an M-SRV 106 or an F-SRVs 108. In a step 402, the device receives a carousel packet from this server.

In a step 404, the device determines whether the packet has been previously received and stored in a packet carousel buffer. If so, then a step 408 is performed in which a reception timestamp of the previously received and stored packet is updated. Otherwise, operation proceeds to a step 410. In step 410, the received packet is added to the carousel. This step may comprise storing the packet in memory.

A step 412 follows steps 408 and 410. In step 412, the device updates its packet carousel data structure(s). These data structures may include various pointers in which each pointer references a particular packet that has been stored in memory (e.g., in a carousel packet buffer). Accordingly, step 412 may comprise changing the referenced packet(s) of one or more pointers.

In a step 414, the device determines whether one or more clean-up conditions, such as the occurrence of a scheduled clean-up time, are satisfied. If so, then operation proceeds to a step 416. In this step, the device removes one or more expired packets from its packet carousel buffer. In addition, information pertaining to the removed packets may be deleted from the carousel data strictures.

The operation of FIG. 4 also involves the transmission of packets. Accordingly, in a step 418, the device determines whether available transmission bandwidth exists. If so, one or more packets in the packet carousel buffer are transmitted in accordance with the amount of available bandwidth in a step 420. These one or more packets are selected for transmission according to a queued order.

The flowchart of FIG. 4 is provided as an illustrative example, and not as a limitation. Accordingly, the steps of FIG. 4 may be performed in other sequences, as well as in parallel. Also, one or more of the illustrated steps may be bypassed. Moreover, additional steps may be included.

VI. Exemplary Architecture

A. Overview

Figure 5:
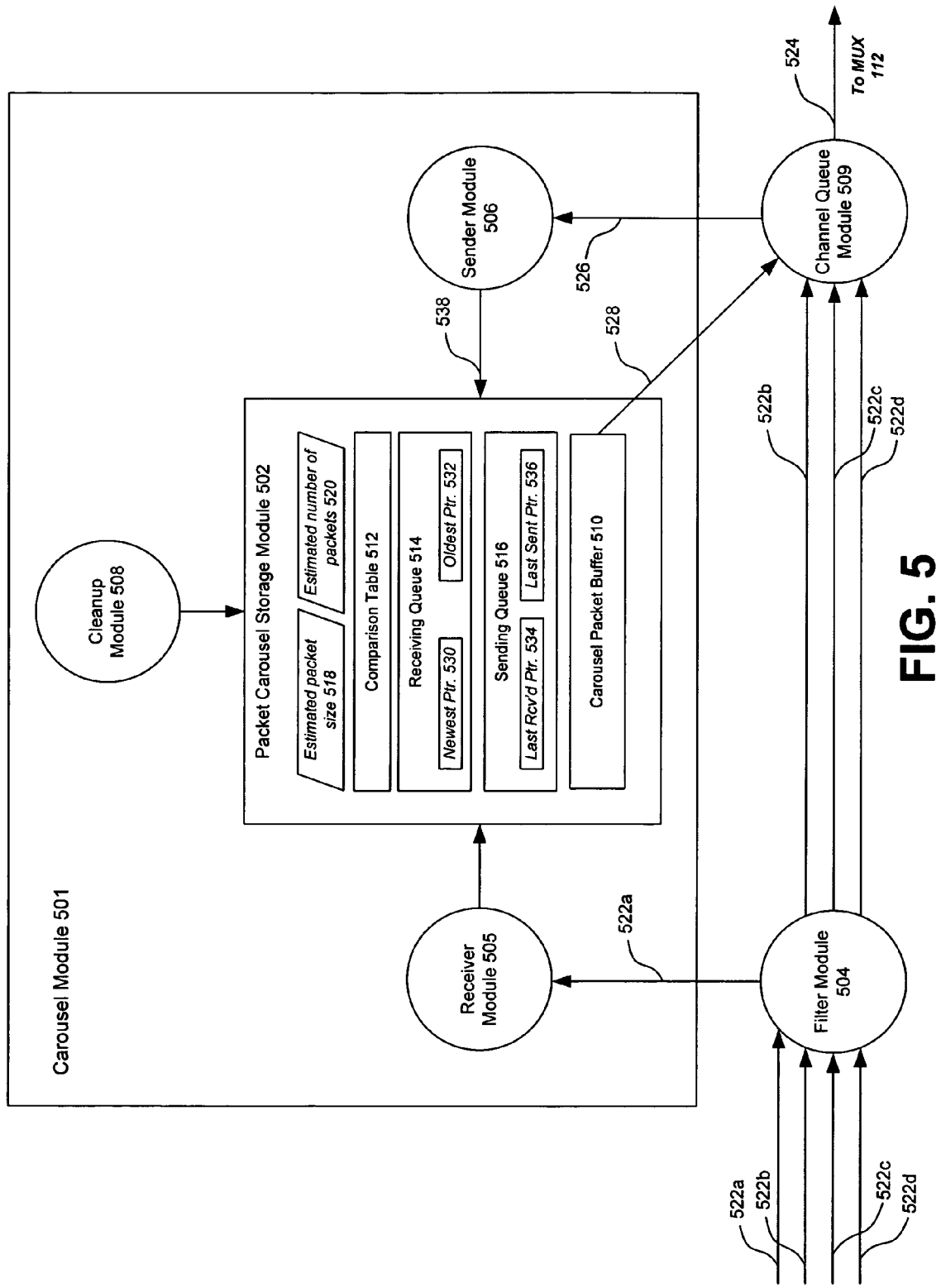
FIG. 5 is a diagram of an architecture according to an embodiment of the present invention.

FIG. 5 shows an architecture that may be used to perform techniques of the present invention, such as the operational sequence of FIG. 4. With reference to the environment of FIG. 1, this architecture may be implemented in an IPE 110. The architecture of FIG. 5 includes a carousel module 501, a filter module 504, and a channel queue module 509. These elements may be implemented in hardware, software, firmware, or any combination thereof. In implementations involving software, object oriented development techniques may be employed.

As described above, devices such as IPEs 110 receive packets from various sources, such as M-SRVs 106 and F-SRVs 108. FIG. 5 shows that each of these packets is associated with a particular stream 522. Filter module 504 receives these packets and, based on their associated streams 522, identifies them as either carousel packets or non-carousel packets. This identification may be based on one or more criteria (also referred to herein as "filtering criteria"). Filtering criteria may include, for example, the values of address fields in packet headers because these values indicate particular streams.

Upon identification, filter module 504 forwards the carousel packets to carousel module 501 and the non-carousel packets to channel queue module 509. For example, FIG. 5 shows filter module 504 forwarding packets associated with stream 522a to carousel module 501 and forwarding packets associated with streams 522b-d to channel queue module 509.

Carousel module 501 stores and processes carousel packets for their delivery to device(s) across a transmission medium. This delivery (which is controlled by channel queue module 509) is based on the availability of spare bandwidth in the transmission medium. Further details regarding the structure and performance of carousel module 501 are provided below.

Channel queue module 509 enqueues packets for delivery across a transmission medium, such as a DVB or cable network. As described above, channel queue module 509 receives non-carousel packets from filter module 504. In addition, channel queue module 509 receives carousel packets from carousel module 501. These carousel packets are received in response to a command 526 issued by channel queue module 509. In embodiments, channel queue module 509 issues this command when the corresponding transmission medium (or media) have at least a predetermined amount of spare bandwidth.

This determination may be based on queue length statistics, such as the number of packets currently enqueued by channel queue module 509. In embodiments, channel queue module 509 attempts to keep its buffer half-full. Therefore, when the buffer is less than half full, channel queue module 509 may issue command 526.

As shown in FIG. 5, channel queue module 509 generates a sequence 524 of transmission packets for transmission in a broadcast network. Accordingly, FIG. 5 shows that sequence 524 may be sent to a device such as a MUX 112. However, in embodiments, stream 524 may be forwarded to other devices.

B. Carousel Module

FIG. 5 shows that carousel module 501 includes a packet carousel storage module 502 and various operational modules. These operational modules include a receiver module 505, a sender module 506, and a cleanup module 508.

Receiver module 505 obtains carousel packets from filter module 504 and stores these packets (as well as related information) in packet carousel storage module 502. For instance, the carousel packets are stored in a packet buffer 510 and the related information is stored in various storage elements that are referred to herein as access data structures.

Sender module 506 is triggered by command 526 from channel queue module 509. As described above, this command is issued when at least a predetermined amount of transmission bandwidth exists. Command 526 designates that one or more packets can be fetched from packet carousel storage module 502. Thus, upon receipt of command 526, sender module 506 issues a fetch instruction 538 to carousel storage module 502. In response to instruction 538, one or more stored packets 528 are sent from carousel packet buffer 510 (within carousel storage module 502) to channel queue module 509 for enqueueing. However, these stored packets are not necessarily deleted from buffer 510. Also in response to command 538, information stored in carousel storage module 502 that is related to the fetched packet(s) is updated. In embodiments, this updating is performed by sender module 506.

Cleanup module 508 deletes packets from carousel packet buffer 510. Upon deletion of such packets, cleanup module 508 also deletes corresponding information in the access data structures (for instance, comparison table 512, receiving queue 514, and sending queue 516). These deletions may be performed upon the occurrence of certain events and/or at expiry time periods. Thus, cleanup module 508 may advantageously promote efficient memory utilization for packet carousel storage module 502.

C. Packet Carousel Storage Module

As shown in FIG. 5, packet carousel storage module 502 includes a carousel packet buffer 510 that stores carousel packets. Carousel packet buffer 510 stores carousel packets that are received from devices, such as M-SRVs 106 and F-SRVs 108. In embodiments, each carousel packet is stored in a contiguous memory area within carousel packet buffer 510. FIG. 5 shows a single carousel packet buffer 510. However, architectures may include multiple packet buffers. In such architectures, each packet is stored completely inside an individual packet buffer.

In addition, packet carousel storage module 502 includes various elements (referred to herein as access data structures) that store information related to the packets stored in carousel packet buffer 510. In embodiments, these data structures include a comparison table 512, a receiving queue 514, and a sending queue 516. Each of these data structures contains information regarding the individual carousel packets stored in buffer 510. In addition, these data structures may include pointers to the packets in buffer 510. In embodiments, these data structures are organized as linked lists. This provides for efficient memory utilization. However, other storage techniques (e.g., arrays, container class objects, etc.) may be used.

Comparison table 512 is accessed or "looked up" by receiver module 505 to determine whether each incoming carousel packet has been previously received. Comparison table 512 includes a plurality of table entries. Each of these entries stores a value, such as a hash value, that corresponds to a packet in carousel packet buffer 510. In addition, each of these entries may include a pointer to an entry in receiving queue 514, and a pointer to an entry in sending queue 516. In addition, each entry in comparison table 512 may include a pointer to a collision list.

Hash values are numeric values calculated from data records, such as carousel packets, using a formula. These numeric values provide a set of indices (called a hash table). Thus, to search for a record containing particular data (e.g., a particular IP packet), the formula is applied to a received carousel packet to obtain the corresponding hash value. This technique is more efficient than searching through all the records until the matching record is found. Thus, comparison table 512 can be accessed to determine whether a particular incoming packet has been previously received (e.g., whether a matching hash value exists). If not, then the carousel packet is considered new.

Receiving queue 514 includes a plurality of entries, each corresponding to a packet in carousel packet buffer 510. Each of these entries comprises an index value (e.g., a hash value) of the corresponding packet. This value is used for looking up the record in comparison table 512. In addition, each of these entries includes a reception timestamp of the corresponding packet. This timestamp may be used to determine whether a packet has expired. In addition, each entry includes a pointer to an packet in packet buffer 510.

The entries in receiving queue 514 are arranged in a chronological order according to the values of their reception timestamps. This arrangement advantageously facilitates efficient removal of expired IP packets. Receiving queue 514 may be implemented in various ways. In one such implementation, receiving queue 514 is a doubly linked list. In addition to having multiple entries, receiving queue 514 may include pointers to particular entries. For instance, receiving queue 514 may have a newest packet pointer 530 and an oldest packet pointer 532. Newest packet pointer 530 points to the beginning of receiving queue 514. In contrast, oldest packet pointer 532 points to the end of receiving queue 514.

In embodiments, whenever a packet is received (whether or not it is already stored in carousel packet buffer 510), its reception timestamp is refreshed. That is, the reception timestamp is set to the current time. This refreshing operation is performed by receiver module 504.

At various times, older packets that haven't been received or refreshed for at least a predetermined amount of time (also referred to as the expiry period) are removed from the end of receiving queue 514. As described above, removal may be performed by cleanup module 508. Removal may occur upon certain event(s) such as whenever a new packet is inserted. Also, this removal operation may occur at one or more scheduled times. For example, in embodiments, this removal operation is performed at least once every half of an expiry period. When a packet is removed, its corresponding information is removed from the other access data structures (i.e., comparison table 512, receiving queue 514, and sending queue 516).

Sending queue 516 includes a plurality of entries, each corresponding to a packet in carousel packet buffer 510. Each of these entries comprises a pointer to the corresponding packet. Sending queue 516 may be implemented in various ways. In one such implementation, sending queue 516 is a doubly linked list.

Sending queue 516 is arranged to ensure that active packets in carousel packet buffer 510 are sent in a specified order. For instance, packets which are new (e.g., packets which have never been sent) are accorded priority. More particularly, if there are new packets in carousel packet buffer 510, the oldest of such new packets is sent first, followed by the next oldest, etc. However, when packet buffer 510 contains no new packets, packets with the oldest previous sending time are given the highest priority.

To implement such ordering of transmissions, various locations may be designated in sending queue 516. For instance, sending queue 516 may include a last received pointer 534 and a last sent pointer 536. Last received pointer 534 designates where new packets are added to sending queue 516. Last sent pointer 536 designates the record (or entry) in sending queue 516 that corresponds to the last transmitted packet. The entries of sending queue 516 that fall between pointers 534 and 536 correspond to carousel packets that have never been sent and, therefore, have priority. In case there are no such packets after a send operation, last received pointer 534 and last sent pointer 536 are advanced (e.g., incremented) together. Any new packets are added after last received pointer 534, which is then advanced to point to the new packet.

As described above, packet buffer 510 includes one or more packets. These packets are stored in an allocated memory space. Each packet is located in this memory space according to its corresponding hash value. Therefore, based on the its hash value, a carousel packet in packet buffer 510 may be located and operated on (e.g., inserted, accessed, deleted, etc.). In embodiments, sufficient memory is allocated to packet buffer 510 so that paging is avoided. This advantageously improves performance speed and access times.

D. Receiving and Sending

As described above, receiver module 505 operates on carousel packets that it receives from filter module 504. For example, receiver module 505 hashes the carousel packets using, for example, a strong hash algorithm. The resulting hash value is then looked up in comparison table 512. This lookup operation employs double hashing. More particularly, receiver module 505 looks up a predetermined number, n, of the hash value's last bits. Then, if required, receiver module 505 looks up the n next-to-last bits of the hash value. Finally, collision lists are looked up.

If the lookup operation does not find the hash value in comparison table 512, then the carousel packet is new. Accordingly, receiver module 505 places the carousel packet into carousel packet buffer 510. In addition, receiver operation 505 inserts corresponding entries into comparison table 512 (a previously deleted hash table entry can be reused), into receiving queue 514 (at the top), and into sending queue 516 (after the last received descriptor pointer, which is then advanced to point to the newly inserted descriptor).

If the lookup operation finds the hash value in comparison table 512, then receiver module 505 determines that the packet carousel packet is old. Therefore, receiver module 505 brings the packet's descriptor to the beginning of receiving queue 514 and the reception timestamp of the corresponding packet that is already stored in packet buffer 510 is refreshed.

As described above, channel queue module 509 receives packets from various streams. For instance, FIG. 5 shows channel queue module 509 receiving packets from streams 522b, 522c, and 522d. In addition, channel queue module 509 receives fetched carousel packets 528 (which FIG. 5 shows as being associated with stream 522a) from carousel packet buffer 510. Channel queue module 509 includes a buffer (not shown) that enqueues these received packets and releases packets at an available transmission rate across, for example, a time slice in a broadcast transmission medium.

When channel queue module 509 issues command 526, last sent pointer 536 in sending queue 516 is advanced. In cases where last received pointer 534 is identical to last sent pointer 536, both are advanced together. At this point, the packet to which the descriptor now points can be sent to channel queue module 509 upon instruction from sender module 506.

E. Memory Allocation

The amount of information that the elements of carousel storage module 502 need to store is a-priory unknown. Therefore, in embodiments, one or more portions of packet carousel storage module 502 (e.g., packet buffer 510, comparison table 512, receiving queue 514, and/or sending queue 516) may be flexible in size. This flexibility may be based on parameters, such as an estimated packet size parameter 518 and an estimated number of packets parameter 520. From these parameters, memory allocation requirements for portion(s) of storage module 502 can be predicted. The more accurate these parameters are, the more efficient memory allocations become.

However, in further embodiments, memory may be allocated flexibly on a packet-by-packet basis. For instance, an operating system's memory allocator may be used to individually allocate heap space for each carousel packet. In yet further embodiments, memory is allocated in bigger portions or chunks of memory to optimize packet allocation. For such allocation techniques, a code (such as a first byte of 0x00) may identify a deleted packet. Also, subsequent bytes may be used to store information that helps memory allocation processes reuse memory.

In such embodiments, storage module 502 may include its own light-weight memory management functionality (e.g., software) that provides features, such as not returning the memory of expired packets. Notwithstanding this, carousel packet buffer 510 is freed (i.e., its memory is returned to the operating system) upon termination of packet carousel storage module 502.

F. Exemplary Implementation of Access Data Structures

Figure 6:
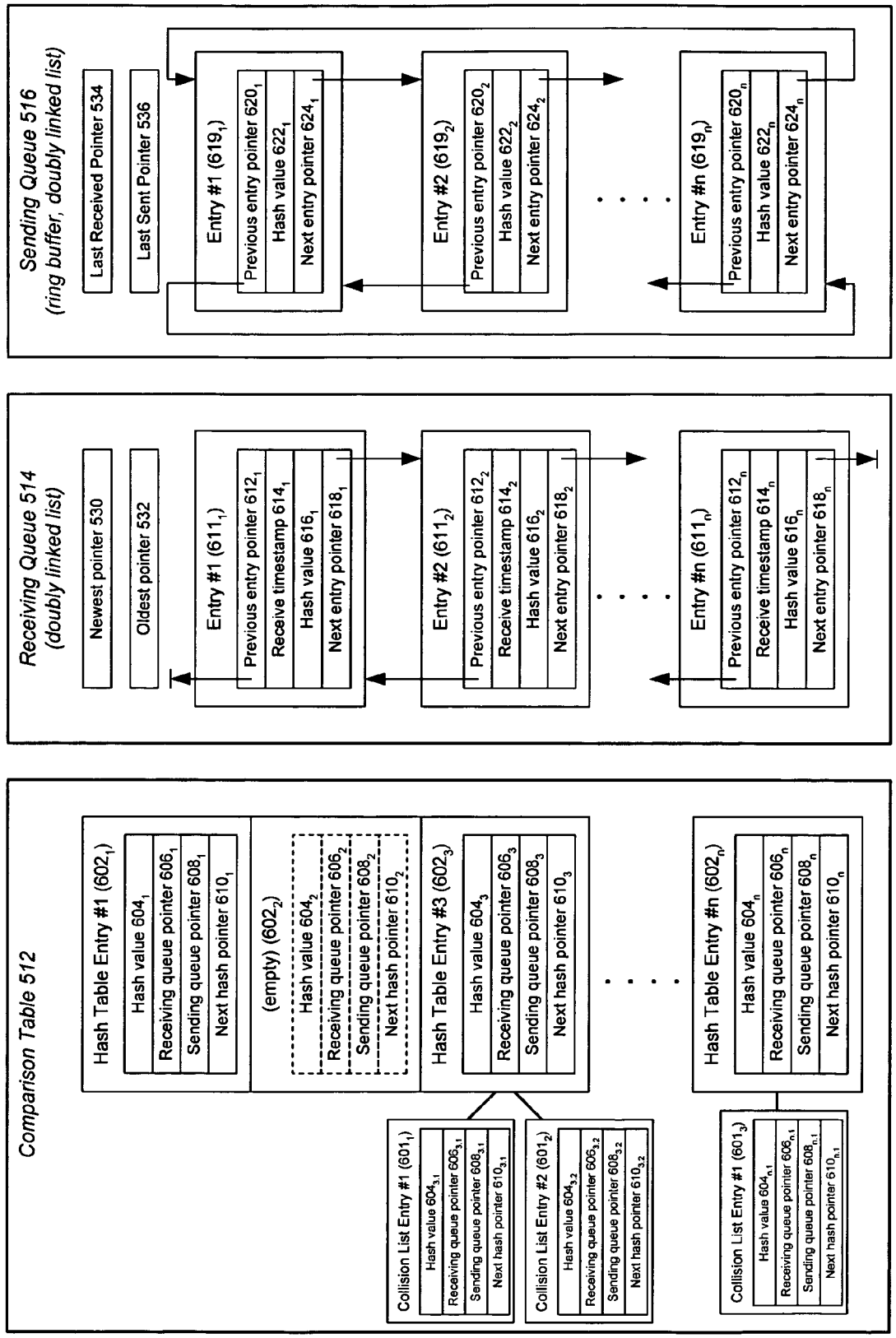
FIG. 6 is a diagram showing an exemplary implementation of access data structures according to an embodiment of the present invention.

FIG. 6 is a diagram showing exemplary implementations of comparison table 512, receiving queue 514, and sending queue 516. As shown in FIG. 6, comparison table 512 includes a plurality of hash table entries 602. Each entry 602 includes a hash value 604, a receiving queue pointer 606, a sending queue pointer 608, and a next hash pointer 610.

Each hash value 604 is a hash value computed from the corresponding carousel packet. Each receiving queue pointer 606 and sending queue pointer 608 references the respective locations in receiving queue 514 and sending queue 516 for the corresponding carousel packet. In the example of FIG. 6, comparison table 512 is implemented as a linked list. Accordingly, each next hash pointer 610 points to the next entry 602.

One or more collision list entries 601 may be associated with each entry 602. Collision list entries 601 are used to resolve the identity of different packets that produce the same hash value. As shown in FIG. 6, collision list entries 601 (like hash table entries 602) include a hash value 604, a receiving queue pointer 606, a sending queue pointer 608, and a next hash pointer 610. Next hash pointer 610 points a next collision entry 601 (if one exists). A pointer (not shown) in the corresponding hash table entry 602 may point to the corresponding collision list.

The example of FIG. 6 shows an empty hash table entry $602_2$. Such entries may have predetermined values and pointers (e.g., NULL). In embodiments, the previous table entry $602_1$ has a next hash pointer 610 that does not reference the empty hash table entry $602_2$. Instead, this hash table entry references hash table entry $602_3$.

FIG. 6 shows receiving queue 514 having newest pointer 530, oldest pointer 532 and a plurality of entries 611. Each entry 611 includes a previous entry pointer 612, a receive timestamp 614, a hash value 616, and a next entry pointer 618. As described above, each receive timestamp 614 stores the most recent timestamp of the corresponding packet in carousel packet buffer 510. Each hash value 616 is computed from the corresponding carousel packet value and enables the packet to be located in packet buffer 510. In FIG. 6, receiving queue 514 is implemented as a doubly linked list. Therefore, each previous entry pointers 612 references the previous entry 611 (if one exists), and each next entry pointer 618 references the next entry 611 (if one exists).

As shown in FIG. 6, sending queue 516 includes last received pointer 534, last sent pointer 536, and one or more entries 619. Each entry 619 includes a previous entry pointer 620, a hash value 622, and a next entry pointer 624. Each hash value 622 is computed from the corresponding carousel packet value and enables the packet to be located in packet buffer 510. In FIG. 6, sending queue 516 is implemented as a doubly linked list configured as a ring buffer. Therefore, each previous entry pointer 620 references the previous entry 619, and each next entry pointer 624 references the next entry 619. However, for the first entry (i.e., entry 619₁) the previous entry pointer 620 points to the last entry (i.e., entry 619ₙ). In a similar manner, for last entry 619ₙ, the next pointer 624 (i.e., next pointer 624ₙ) points to the first entry 619₁.

VII. Hash Table

As described above, hash values may be calculated from received packets. In embodiments, each of these values is a strong hash value (eg. MD5, SHA-1) that is calculated over the complete packet, including its header(s). Thus, for IP packets, these hash values may have a length of between 192 and 256 bits.

In embodiments, the algorithm used to calculate the IP hash value is so strong that, for practical purposes, the probability of different IP packets having the same hash value can be ignored. In embodiments utilizing a keyed hash algorithm, the employed key must be the same for all hash operations of a given packet carousel.

Using hash values calculated over the IP packets as hash table indices requires the implementation of a very large table. However, strong hash algorithms advantageously allow for the last n bits of a hash value to be used as an index. Thus, embodiments of the present invention provide a hash table having the size $2^n$. A typical value for n is in the range of between 10 and 20. These values of n yield hash table sizes in the range of between one thousand and one million, and IP packet buffer sizes of up to 1.5 gigabytes.

The size of the hash table should be chosen as $\log_2$ ("estimated number of packets")+1. However, other values of n may be used. In case "estimated number of packets" is not given, or turns out to be too small (when the actual number of packets in the hash table approaches the size of the hash table), embodiments of the present invention rehash the comparison table into a larger hash table (e.g., twice the size). The decision to rehash may be based on session duration and the rate at which new packets arrive (e.g., no rehashing for a packet carousel that is close to the end of its lifetime or where it can be estimated that the number of packets will not exceed twice the size of the current hash table).

When looking up a hash value of a carousel packet in comparison table 512 (using the last n bits as the hash index), a hash value having the same last n bits, but a different overall value, might be encountered. When such collisions occur, embodiments of the present invention take the n next-to-last bits of the hash value as a secondary hash index. If the n next-to-last bits of the hash value is different than the value in comparison table 512, then a collision list is inspected. As described above with reference to FIG. 6, such a collision list may include one or more collision list entries 601.

If the first hash operation leads to an empty cell (e.g., having NULL pointers in both pointer fields), or if the first hash operation leads to a collision and the second hash operation leads to an empty cell, or if the second hash operation leads to a collision and there is no collision list, or if there is a collision list in which the IP hash value can't be found, the packet is not in comparison table 512.

VIII. Carousel Servers

As described above, carousel packets may be generated from files by devices, such as M-SRVs 106 and F-SRVs 108. In embodiments, these devices consistently generate the same packet(s) for each file. This ensures that the repeated transmission of files yields identical sets of packets and that the carousel packet buffers do not unintentionally contain multiple copies of the same packet.

In embodiments of the present invention, servers produce identical sets of repeating packets by not placing timestamps in packets. This. For example, an IP carousel packet produced by an M-SRVs 106 or an F-SRVs may contain a timestamp field having a predetermined, non-changing (or "static") value. In embodiments that employ the architecture of FIG. 5, receiver module 505 may replace these static values with actual timestamp values when it receives carousel packets.

IX. Sessions

As described above with reference to step 401, content providers may establish sessions with devices. Such devices (e.g., IPEs 110) correspond to broadcast networks. A typical session (referred to as a "forwarding session") is one in which each received packet is broadcast exactly once, and therefore has to fit into the allocated bandwidth (e.g., timeslice) of the broadcast network. With reference to the architecture of FIG. 5, packets from a forwarding session (or a forwarding packet stream) with an M-SRV 106 or an F-SRV 108 are passed directly from filter module 504 to channel queue module 509.

In embodiments of the present invention, carousel sessions may be established with devices, such as M-SRVs 106 and/or F-SRVs 108. In such sessions, carousel packets in carousel packet streams are received and processed for repeated transmission. In embodiments, such processing is according to the techniques described herein.

To set up a session, a server and a packet carousel providing device (such as an IPE 110) may engage in various communications. Such communications may include the establishment of one or more parameters that define the session. Table 1, below, provides an exemplary session parameter set.

TABLE 1

SESSION PARAMETERS datacast operator ID
session ID
session type (carousel session or forwarding session)
session title (used for network management only)
session description (used for network management only)
session start date (date when the first IP packet will be transmitted)
session start time (time when the first IP packet will be transmitted)
session duration
session usable bitrate (in case some bitrate should be guaranteed)
session estimated packet size (needed for allocation of guaranteed bitrate)
session estimated number of packets (optional, helps to determine the optimal size of the hash table)
session packet expiry time (this defines the carousel renewal; important for removal of files)
session priority (in case there are multiple carousel sessions, the priority can be used to differentiate)
session FEC ratio (defines MPE-FEC protection on DVB-H level)
session IP version (determines the protocol used for the multicast join message)
session source address (depends on IP version; used for the join; used for rejecting unwanted traffic)
session security policy (encryption, authentication, both, none)
session security parameter seed index
session encryption algorithm
session encryption seed key
session encryption generator key
session encryption key period
session authentication algorithm
session authentication key
1-n discrete number of IP flows (original destination address, translated destination address)
0-1 timeslice channel (if the timeslice channel is not defined, the IP carousel is not timesliced, and takes unused bandwidth from any timeslice channel)

As indicated in Table 1, session parameters may include various information regarding the nature of the carousel session, session starting date and time information, as well as session duration information. Also, various packet related information, such as estimated packet size, and estimated number of packets (which may be used for parameters 518 and 520) is included in the session information. Moreover, various encoding, security, and encryption information may included in the session information.

Table 1 shows that source address is part of the session information. As described above with reference to FIG. 5, such addresses may be the criteria for identifying carousel packets.

X. Exemplary Computer System

Figure 7:
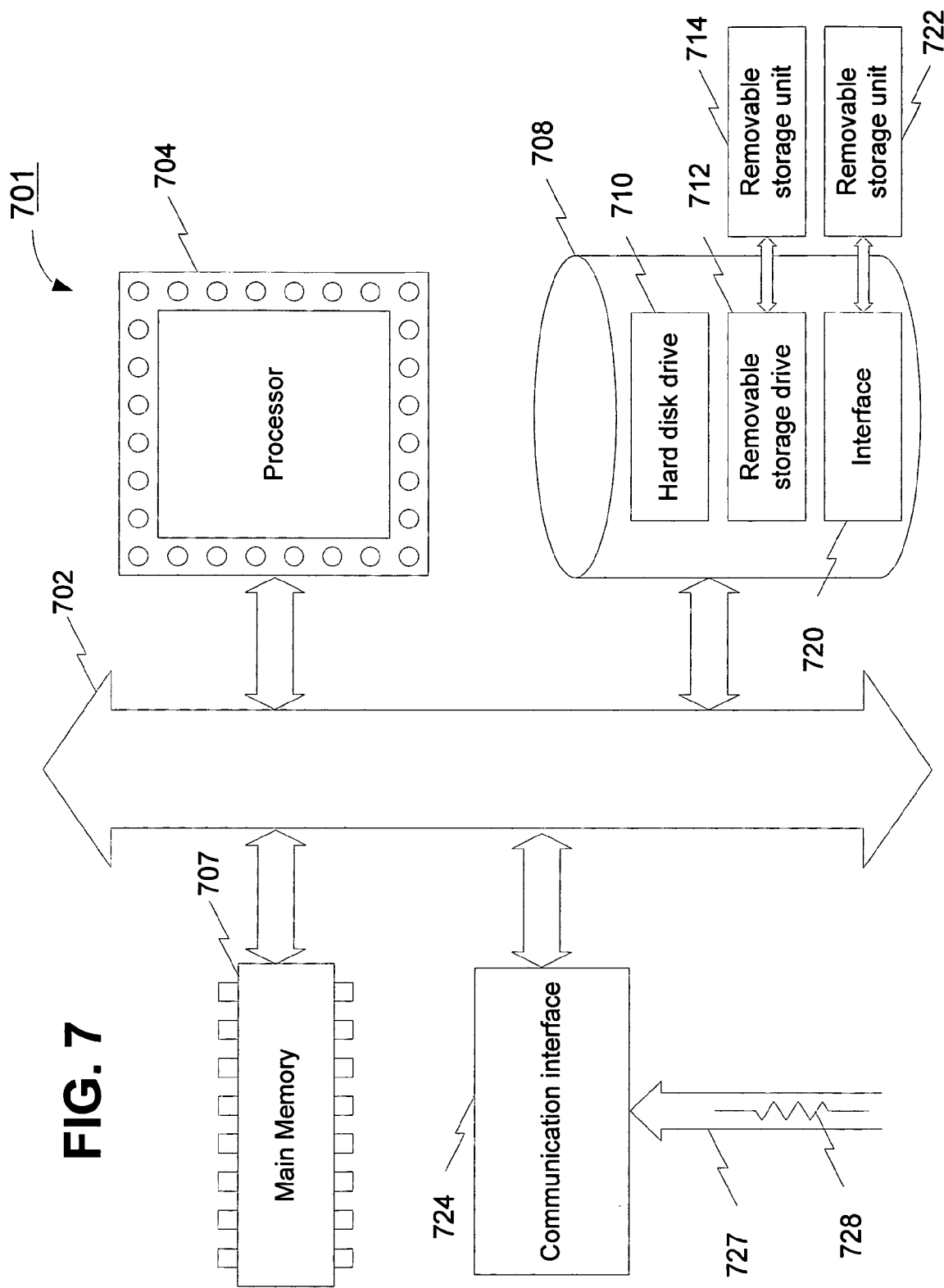
FIG. 7 is a diagram of an exemplary computer system.

The architecture of FIG. 5 may be implemented with one or more computer systems. An example of a computer system 701 is shown in FIG. 7. Computer system 701 represents any single or multi-processor computer. Single-threaded and multi-threaded computers can be used. Unified or distributed memory systems can be used.

Computer system 701 includes one or more processors, such as processor 704. One or more processors 704 can execute software implementing the process described above with reference to FIG. 4. Each processor 704 is connected to a communication infrastructure 702 (for example, a communications bus, cross-bar, or network). Various software embodiments are described in terms of this exemplary computer system. After reading this description, it will become apparent to a person skilled in the relevant art how to implement the invention using other computer systems and/or computer architectures.

Computer system 701 also includes a main memory 707 which is preferably random access memory (RAM). Computer system 701 may also include a secondary memory 708. Secondary memory 708 may include, for example, a hard disk drive 710 and/or a removable storage drive 712, representing a floppy disk drive, a magnetic tape drive, an optical disk drive, etc. Removable storage drive 712 reads from and/or writes to a removable storage unit 714 in a well known manner. Removable storage unit 714 represents a floppy disk, magnetic tape, optical disk, etc., which is read by and written to by removable storage drive 712. As will be appreciated, the removable storage unit 714 includes a computer usable storage medium having stored therein computer software and/or data.

In alternative embodiments, secondary memory 708 may include other similar means for allowing computer programs or other instructions to be loaded into computer system 701. Such means can include, for example, a removable storage unit 722 and an interface 720. Examples can include a program cartridge and cartridge interface (such as that found in video game devices), a removable memory chip (such as an PROM, EPROM, EEPROM, flash memory, etc.) and associated socket, and other removable storage units 722 and interfaces 720 which allow software and data to be transferred from the removable storage unit 722 to computer system 701.

Computer system 701 may also include one or more communications interfaces 724. Communications interfaces 724 allow software and data to be transferred between computer system 701 and external devices via communications path 727. Examples of a communications interface 724 include a modem, a network interface (such as an Ethernet card), a communications port, etc. Software and data transferred via communications interfaces 724 are in the form of signals 728 which can be electronic, electromagnetic, optical or other signals capable of being received by communications interfaces 724, via communications paths 727. Note that communications interfaces 724 provide a means by which computer system 701 can interface to a network such as the Internet.

The present invention can be implemented using software running (that is, executing) in an environment similar to that described above with respect to FIG. 7. In this document, the term "computer program product" is used to generally refer to removable storage units 714 and 722, a hard disk installed in hard disk drive 710, or a signal carrying software over a communication path 727 (wireless link or cable) to communication interfaces 724. A computer useable medium can include magnetic media, optical media, or other recordable media. These computer program products are means for providing software to computer system 701.

Computer programs (also called computer control logic) are stored in main memory 707 and/or secondary memory 708. Computer programs can also be received via communications interfaces 724. Such computer programs, when executed, enable the computer system 701 to perform the features of the present invention as discussed herein. In particular, the computer programs, when executed, enable the processor 704 to perform the features of the present invention. Accordingly, such computer programs represent controllers of the computer system 701.

The present invention can be implemented as control logic in software, firmware, hardware or any combination thereof. In an embodiment where the invention is implemented using software, the software may be stored in a computer program product and loaded into computer system 701 using removable storage drive 712, hard drive 710, or interface 720. Alternatively, the computer program product may be downloaded to computer system 701 over communications paths 727. The control logic (software), when executed by the one or more processors 704, causes the processor(s) 704 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

XI. Conclusion

While various embodiments of the present invention have been described above, it should be understood that they have been presented by way of example only, and not in limitation. For instance, although examples have been described involving DVB-T, DVB-H, and cable technologies, other technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A packet encapsulator, comprising:
   a filter module configured to identify from a plurality of received packets one or more carousel packets;
   a packet buffer configured to store the one or more carousel packets identified by said filter module;
   a channel queue configured to enqueue packets for transmission across a broadcast transmission medium, wherein the channel queue issues to the packet buffer a command when the transmission medium has at least a predetermined amount of spare bandwidth and receives in response to the command the one or more carousel packets from the packet buffer when at least a predetermined amount of available bandwidth exists in the broadcast transmission medium, said channel queue configured to output the enqueued packets to be broadcast over the broadcast transmission medium.

2. The packet encapsulator of claim 1, wherein the broadcast transmission medium is a digital broadcast network.

3. The packet encapsulator of claim 2, wherein the digital broadcast network is a DVB handheld (DVB-H) network.

4. The packet encapsulator of claim 2, wherein the digital broadcast network is a DVB terrestrial (DVB-T) network.

5. The packet encapsulator of claim 1, wherein the broadcast transmission medium is a cable network.

6. The packet encapsulator of claim 1, further comprising:
a comparison table for storing one or more index values, each index value corresponding to a particular carousel packet in the packet buffer.

7. The packet encapsulator of claim 6, wherein each of the index values is a hash value computed from the corresponding carousel packet.

8. The packet encapsulator of claim 6, further comprising:
a receiving queue having one or more entries, each entry corresponding to a particular carousel packet stored in the packet buffer, wherein the one or more entries are arranged in a chronological order according to reception timestamp values of the one or more carousel packets in the packet buffer.

9. The packet encapsulator of claim 6, further comprising:
a sending queue having one or more entries, each entry corresponding to a particular carousel packet stored in the packet buffer;
wherein the sending queue further includes a last received pointer designating where entries corresponding to new packets are to be added, and a last sent pointer designating an entry that corresponds to the carousel packet in the packet buffer that was most recently sent to the channel queue.

10. The packet encapsulator of claim 1, wherein the channel queue further receives forwarding packets from the filter module.

11. The packet encapsulator of claim 1, wherein the plurality of received packets are Internet protocol (IP) packets.

12. A method, comprising:
setting up a carousel session with a remote server;
receiving a carousel packet from the remote server;
adding the received carousel packet to a packet buffer in a storage module when the packet has not been previously received, and otherwise updating a timestamp of the received carousel packet in the packet buffer when the carousel packet has been previously received and stored in the packet buffer;
updating a comparison table, a receiving queue, and a sending queue in the storage module based on the received carousel packet;
receiving an indication of available bandwidth in a broadcast transmission medium from a channel queue;
in response to the indication, sending one or more carousel packets stored in the packet buffer to the channel queue, and
outputting the enqueued packets from the channel queue to be broadcast over the broadcast transmission medium.

13. The method of claim 12, further comprising
removing one or more carousel packets from the packet buffer upon the occurrence of a cleanup condition.

14. The method of claim 12, wherein the cleanup condition is the occurrence of an expiry time period.

15. The method of claim 12, wherein the comparison table, receiving queue, and sending queue include a comparison table for-storing one or more index values, each index value corresponding to a particular carousel packet in the packet buffer.

16. The method of claim 15, wherein each of the index values is a hash value computed from the corresponding carousel packet.

17. The method of claim 12, wherein the carousel packet is an Internet protocol (IP) packet associated with a static timestamp value.

18. The method of claim 12, wherein the channel queue issues to the packet buffer a command when the broadcast transmission medium has at least a predetermined amount of spare bandwidth.

19. The method of claim 18, wherein the broadcast transmission medium is a digital broadcast network.

20. The method of claim 19, wherein the digital broadcast network is a DVB handheld (DVB-H) network.

21. The method of claim 19, wherein the digital broadcast network is a DVB terrestrial (DVB-T) network.

22. The method of claim 18, wherein the broadcast transmission medium is a cable network.

23. The method of claim 12, wherein setting up a carousel session with the remote server includes communicating with the remote server to establish one or more session parameters that define the carousel session.

24. A computer program product comprising a computer readable medium having computer program logic recorded thereon for enabling a processor in a computer system to process packets, the computer program logic comprising:
program code for enabling the processor to set up a carousel session with a remote server;
program code for enabling the processor to receive a carousel packet from the remote server;
program code for enabling the processor to add the received carousel packet to a packet buffer in a storage module when the packet has not been previously received, and otherwise for enabling the processor to update a timestamp of the received carousel packet in the packet buffer when the carousel packet has been previously received and stored in the packet buffer;
program code for enabling the processor to update a comparison table, a receiving queue, and a sending queue in the storage module based on the received carousel packet;
program code for enabling the processor to receive an indication of available bandwidth in a broadcast transmission medium from a channel queue;
in response to the indication, program code for enabling the processor to send one or more carousel packets stored in the packet buffer to the channel queue, and
program code for enabling the processor to output the enqueued packets from the channel queue to be broadcast over the broadcast transmission medium.

* * * * *